Feb. 20, 1951 R. P. C. RASMUSEN 2,542,093
AUTOMATIC STUD WELDER WITH INTEGRAL TRANSFORMER
Filed Nov. 16, 1949 5 Sheets-Sheet 2

INVENTOR
Reidar P. C. Rasmusen
BY
*J. P. Moran*
ATTORNEY

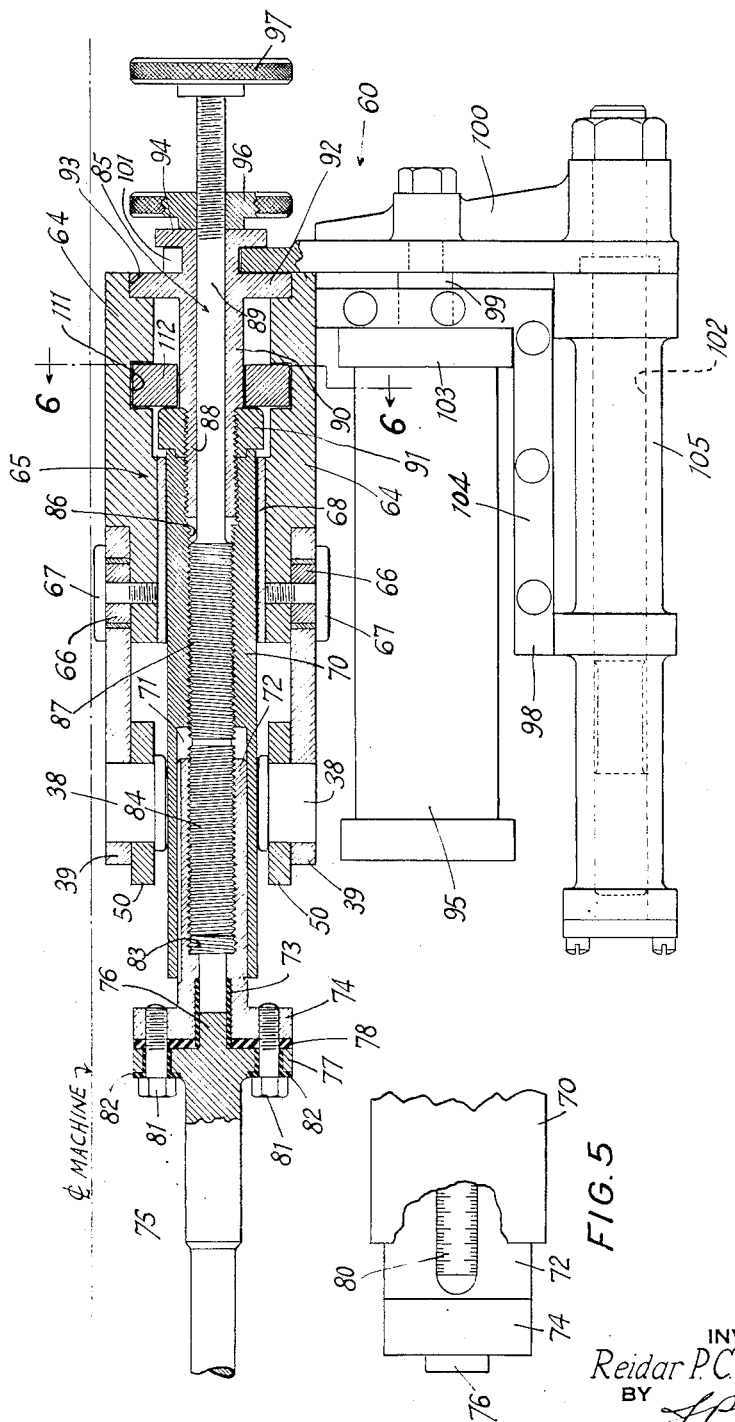

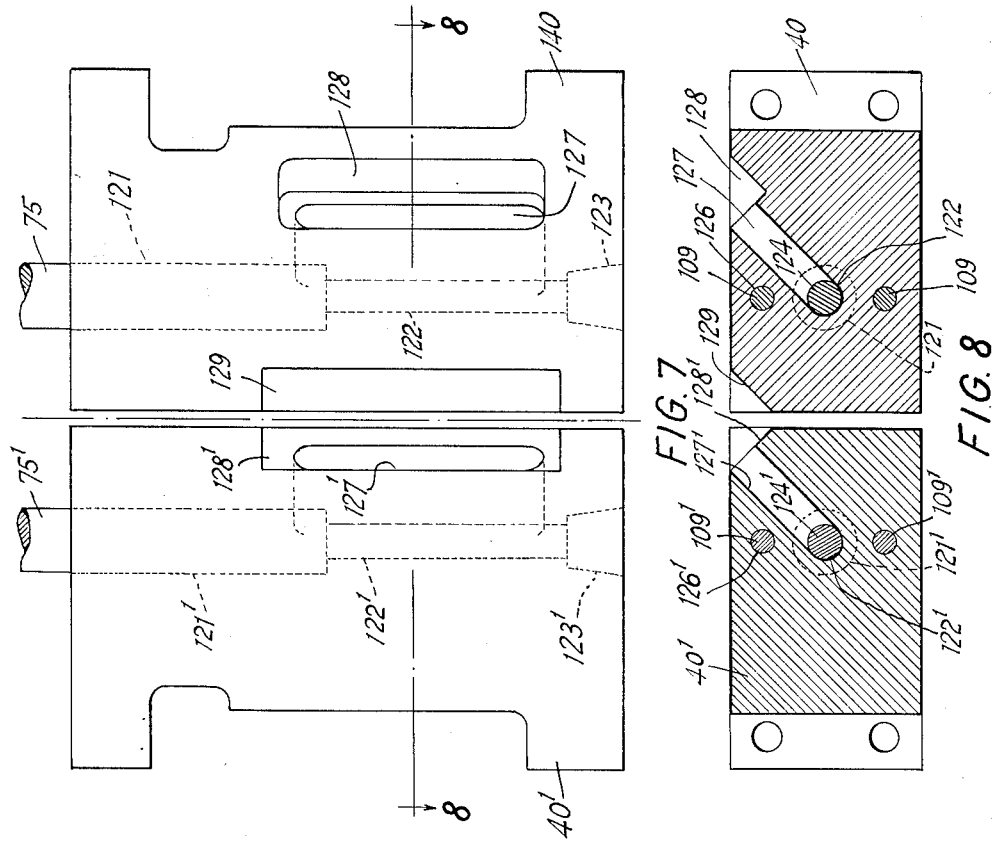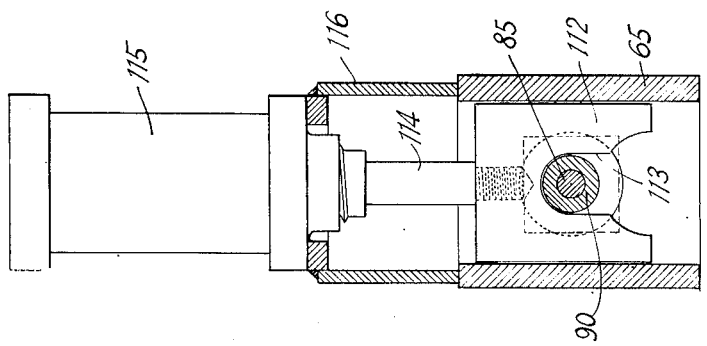

Patented Feb. 20, 1951

2,542,093

UNITED STATES PATENT OFFICE 2,542,093

AUTOMATIC STUD WELDER WITH INTEGRAL TRANSFORMER

Reidar P. C. Rasmusen, Akron, Ohio, assignor to The Babcock & Wilcox Company, Rockleigh, N. J., a corporation of New Jersey Application November 16, 1949, Serial No. 127,539

13 Claims. (Cl. 219—4)

1

This invention relates to electric resistance welding apparatus and, more particularly, to an improved, automatic stud welder of high electrical efficiency and designed for use in production welding operations.

The invention stud welder is particularly designed for use in the manufacture of studded tubes for boilers or furnaces. These studded tubes have externally projecting studs, of a selected cross-sectional shape, welded to their outer surfaces. When the tubes are assembled in a boiler or furnace construction, the studs are used to support refractory walls or the like. Additionally, they may serve as extenders or increasers of the heat absorbing surfaces of the tubes.

In the attachment of studs to these tubes, the tubes are fed relatively to a stud welding machine which attaches studs to the tubes at predetermined locations, longitudinal or circumferential spacings, or the like. The studs are held in movable holders electrically connected to the secondary winding of a welding transformer and, when the studs are engaged with the tube, a resistance welding circuit is completed including the studs and the work. To assure continuous uniformity of the welds, means may be provided to control the amount and duration of the welding current flow and the pressure with which the studs are engaged with the work.

In order to provide welding current to the studs and the work, either the studs or their holding dies and clamps, and frequently the work or tube, must be electrically connected to the secondary winding of the welding transformer. The studs must be movable in order to be forced under pressure against the work, and this factor has hitherto required flexible welding current cables or leads between a stationary welding transformer and the movable clamps, dies and studs, such flexible leads being sufficiently long to accommodate the necessary movement of the movable elements. These relatively long leads, being sufficiently flexible to accommodate the necessary movement and carrying relatively large currents, introduce large resistance losses into the welding circuit, adding substantially to the cost per weld. Any shortening of the secondary leads or any increase in their cross-sectional areas reduces their flexibility below that required for the necessary mobility of the dies or studs.

The invention stud welder avoids the foregoing difficulties and electrical losses by integrating the stud holding clamps and dies with the transformer secondary winding, and reciprocating the transformer secondary, the clamps, the dies, and associated stud feeding and locking means, as a unit relative to the metallic member or tube. To this end, the transformer secondary is mounted on a slide movable toward and away from the work. The secondary winding is a single turn winding with open ends, comprising a pair of parallel, longitudinally arranged heavy conductor bars electrically interconnected at their rear or outer ends. The forward end of each bar has a massive die, of conductive material such as copper or brass, mounted thereon and each supporting a stud clamp or chuck. When a pair of studs are secured in the chucks and the slide moved forwardly to contact the studs with the work, the studs and the work complete the secondary welding circuit. With this arrangement, the relatively long flexible secondary leads, and their resistance losses, are eliminated, and a low resistance, high current capacity welding circuit is provided.

A factor detracting from the efficiency and speed of production line stud welders has been the time consuming operation required to reload studs in the chucks after each welding operation. To obviate this delay and thereby speed up the process, a feature of the invention stud welder is a stud magazine incorporated in each die, and cyclically operable mechanism movable with the transformer during reciprocation of the latter and operable to automatically feed fresh studs into the holding chucks at the completion of each weld. This mechanism includes push rods longitudinally reciprocable through die passages aligned with the holding chuck passage. As the rods are retracted relative to the dies after a welding operation, fresh studs drop from the magazine into the passages and are pushed into the chucks when the rods are again advanced.

In order to assure proper coordination of the slide movement in relation to the distance from the stud ends to the work, the mechanism is so arranged that the studs are projected a uniform distance beyond the ends of the chucks. It is desirable to utilize the stud welder with studs of differing lengths and, to provide such uniform stud projection irrespective of stud length, a stud length adjustment is provided in the automatic stud feed mechanism.

As stated, the welding transformer is mounted closely adjacent the work so that the dies and chucks may be integrated with the transformer secondary winding. To accommodate the transformer, the stud feeding mechanism is mounted on the transformer supporting slide rearwardly of the transformer, with the push up rods extending through appropriately located passages in the secondary conductor bars. When the studs have been fed into the collet chucks, they are firmly locked therein by chuck operating rods extending through the secondary conductor bars to chuck locking mechanism also mounted on the slide rearwardly of the transformer.

The mounting of the transformer adjacent the work-piece with the stud feeding and chuck operating mechanism rearwardly of the transformer tends to elongate the apparatus, perpendicularly to the production line, if the slide moving apparatus is mounted in line with the transformer. Such elongation is not conducive to the most efficient use of the available floor space. In the invention stud welder, air pressure operated slide moving mechanism is mounted in the apparatus substantially beneath the transformer, with the operating end of the piston rod of the main cylinder directed rearwardly. The required reversal of motion is effected by lever means extending through the supporting surface of the transformer slide and pivotally mounted intermediate their ends. The lower ends of the levers are operatively connected to the piston rod of the main cylinder and the upper ends of the levers are connected to a guide forming part of the operating means for the stud push up rods, this guide being secured to the slide so as to be fixed therewith.

After the studs have been fed into the chucks by the push up rods, the main cylinder operates, under low pressure, to rock the levers and push the slide forwardly until the studs first contact the work member or tube. At this point, a toggle-operated stop prevents further slide movement and limit switch means initiate operation of mechanism to lock the rods to the guides, and initiate operation of the collet chuck locking mechanism. Completion of these operations effects release of the stop and initiation of the weld cycle. The low pressure push up of the studs continues during an initial welding pulse. After an interposed cooling period, high pressure stud push up is effected during a subsequent welding pulse and a preselected "hold" time. A timer then initiates unlocking of the collet chucks, withdrawal of the slide, unlocking of the push rods, and withdrawal of the latter so that fresh studs move into the push rod passages in the dies. The push rods then move forwardly to feed the fresh studs into the welding chucks and the welding cycle may be repeated.

The stud feeding means may be selectively operated either under manual or under automatic control, and may be operated either individually or together, thus imparting flexibility to the operation of the welder.

With the foregoing in mind, it is an object of the present invention to provide an improved automatic stud welder of the electric resistance type having a novel, highly efficient welding transformer secondary circuit.

Another object is to provide such a stud welder of compact construction and flexible in operation.

A further object is to provide such a stud welder including cyclically operable means feeding fresh studs automatically to welding dies at the end of each welding cycle.

Yet another object is to provide such a stud welder capable of operating automatically with studs of differing lengths.

These and other objects, advantages, and novel features of the invention will be apparent from the following description and the accompanying drawings.

In the drawings:

Fig. 4 is a horizontal sectional view through one of the stud feeding mechanisms and its associated locking arrangement;

Fig. 5 is a partial side elevation view showing a stud length selecting scale incorporated in the stud feeding mechanism;

Fig. 6 is a vertical sectional view on the line 6—6 of Fig. 4;

Fig. 7 is a plan view of the welding dies;

Fig. 8 is a transverse section view on the line 8—8 of Fig. 7; and

Figure 1:
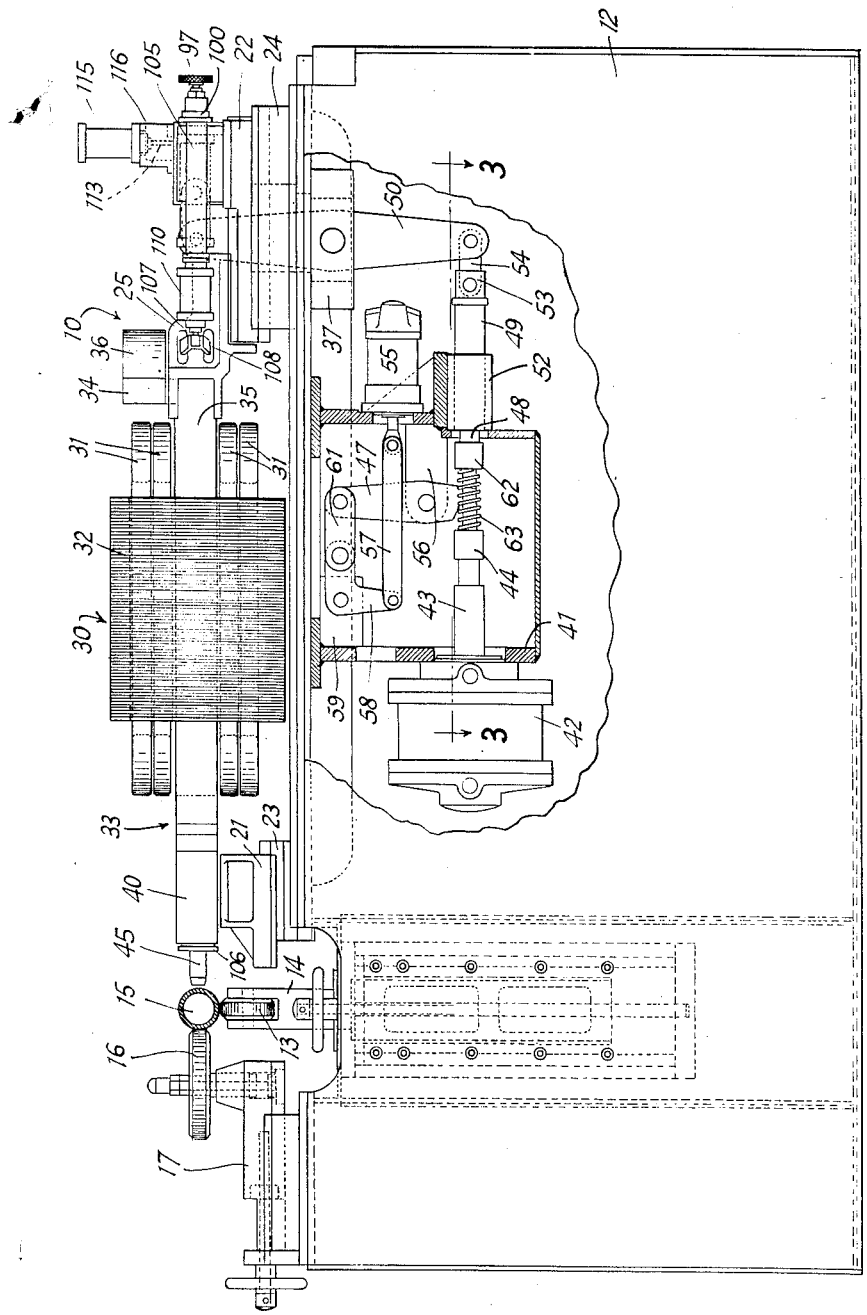
Fig. 1 is a side elevation view of a stud welder embodying the invention.
Figure 2:
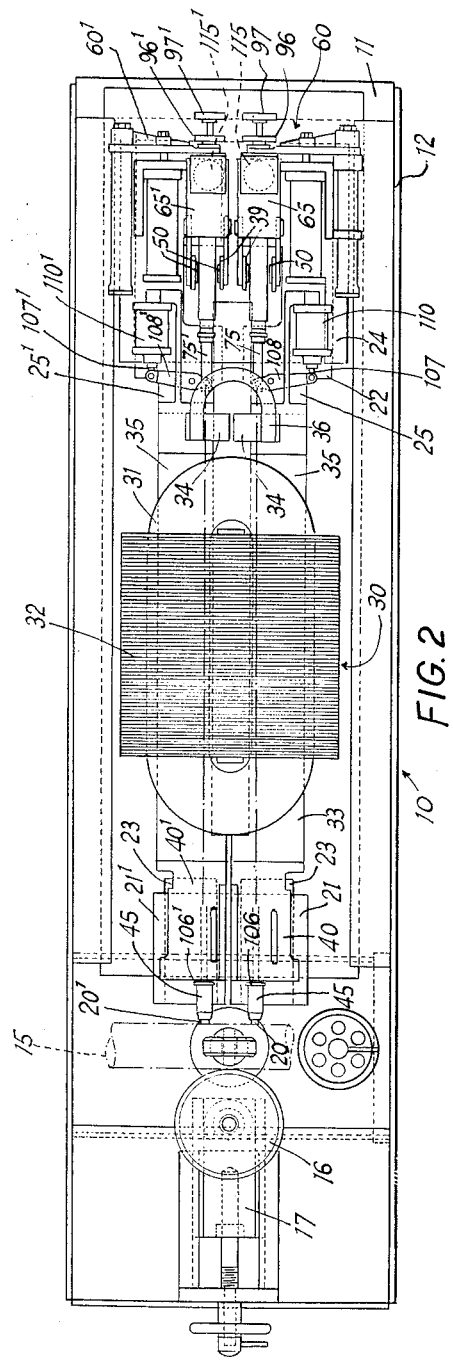
Fig. 2 is a plan view of the stud welder.

Referring first to Figs. 1 and 2, the invention principles are illustrated as incorporated in a stud welder 10 arranged to weld round studs 20, 20', in radially projecting relation to a tube 15, such as a studded tube for use in heat exchange apparatus. In the illustrated arrangement, welder 10 is mounted on an elevated base 11 supported on an enclosing housing 12 extending at right angles to a work or production line along which tube 15 is moved longitudinally. The tube is positioned on adjustable supporting means including a vertical roll 13, mounted on a vertically adjustable slide 14, and a horizontal roll 16 mounted on a laterally adjustable slide 17. Adjustment of slides 14 and 17 positions tube 15 in proper operative relation to stud welder 10.

The welding transformer and its mounting

The welding current is furnished by a transformer 30 mounted adjacent the tube supporting means and including primary windings 31, shown as four in number, a laminated core 32, and a single turn open end secondary winding 33 comprising a pair of parallel, large cross-sectional area bars 35 of suitable electrically conductive material such as copper or a copper alloy. The primary windings 31 are disposed in pairs above and below the secondary winding 33, core 32 embracing the windings and having a central leg extending through the primary windings and between bars 35.

Core 32 and primary windings 31 are fixedly secured to base 11, which latter is longitudinally, manually adjustable on housing 12 to accommodate different sizes of tube 15. Secondary winding bars 35 are supported on base 11 by slide means including forward slides 21, 21' and a rear slide 22, slides 21, 21' being slidable on tracks or blocks 23 fixed to base 11 and slide 22 being slidable on tracks or blocks 24, likewise fixed to base 11. The transformer secondary bars interconnect slides 21 and 22 to act as a unitary slidable supporting means for the transformer secondary and associated elements.

The forward end of each bar 35 has secured thereto a die 40, 40' of cast copper or copper alloy, and each die is mounted on and secured to a slide 21. As described more fully hereinafter, each die 40 or 40' acts as a magazine for studs 20, 20', and mechanism is provided for cyclically feeding studs from the dies into collet chucks 45, each mounted on the forward end of a die, and for locking the studs in the collet chucks. The rear ends of bars 35 are supported by and secured in brackets 25, 25' mounted in transversely spaced relation on rear slide 22 to which the brackets are firmly secured. A pair of electrically conductive blocks 34, 34 are mounted on brackets 25, 25' in conductive relation with bars 35, and blocks 34 are electrically and mechanically interconnected by a heavy, electrically conductive strap 36.

Rigid bars 35 being mechanically secured to dies 40, 40' and to brackets 25, 25', and the dies and brackets being mechanically secured to sides 21, 21' and 22, the bars 35 interconnect the slides to form a unitary slide means. The strap 36 electrically interconnecting the rear ends of bars 35 forms part of an incomplete secondary welding circuit, which has an open forward end comprising dies 40, 40', chucks 45, and studs 20, 20'. The secondary circuit is completed only when the slide means is moved forwardly to engage studs 20, 20' with tube 15. The studs and the tube are thus a direct part of the single turn secondary winding whereby the auxiliary flexible leads hitherto used are eliminated and a low loss, highly efficient welding circuit is provided.

Transformer reciprocating mechanism

Figure 3:
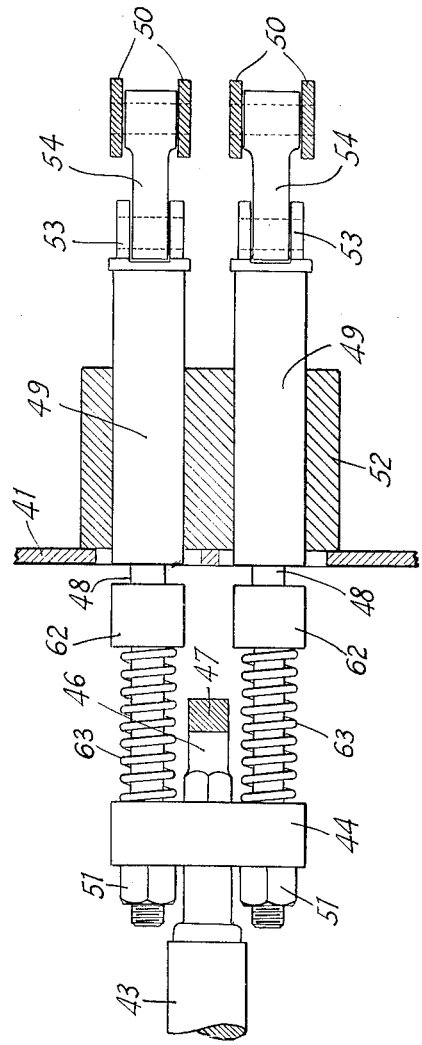
Fig. 3 is a horizontal sectional view taken substantially on the line 3—3 of Fig. 1.

Movement of the slide means carrying the bars 35, the stud feeding means, and the chuck locking means, is effected by power means and associated lever means shown more particularly in Figs. 1 and 3, the lever means acting on a guide forming part of the stud feeding means shown in Figs. 1, 2 and 4, the guide being locked to rear slide 22. Briefly, the stud feeding means includes stud push up rods each extending forwardly through a bar 35 into a die 40, 40', and means for reciprocating the rods to cyclically feed studs from the dies into the collect chucks 45. This latter means include guides locked against movement relative to slide 22, and elements reciprocable in the guides. To force the studs against the work, locking means are provided to selectively lock the reciprocable elements to their guides and thus to slide 22. The stud feeding means and associated locking means are described in greater detail hereinafter.

The slide moving means includes a fabricated lever frame 41 mounted on the undersurface of base 11 and having a pressure cylinder 42 secured on its forward wall. Frame 41 is mounted substantially beneath transformer 30. The piston rod 43 of cylinder 41 has a reduced outer end secured in a cross bar 44 by means of an abutment nut 46 cooperatively related with the lower end of a lock or stop lever 47. A pair of rods 48 have their rear ends slidably engaged through bar 44, with nuts 51 limiting movement of rods 48 in one direction relative to bar 44. Rods 48 have enlarged rearward ends 49 slidably mounted through a guide block 52 on the rear wall of frame 41 and are formed with forks 53 connected by links 54 to the lower ends of two dual levers 50.

Levers 50 extend upwardly through suitable openings in base 11 and slide 22 and are pivoted, intermediate their ends, in a trunnion block 37 on the undersurface of base 11. The upper end of each lever straddles a stud feeding and length adjustment means 60, 60' as shown in Figs. 1 and 4, and carries pins 38 engaged in links 39 connected to the guides of the stud feeding means.

The movement of secondary 33 and its associated stud feeding and chuck locking means takes place in two stages, the first stage effecting engagement of studs 20, 20' with the work, and the second stage forcing the studs under pressure against the work. Stop 47 is provided to arrest movement of levers 50 at the end of the first stage and is released to provide for the further second stage movement. The stop comprises a lever pivotally mounted, intermediate its ends, on a bracket 56 on the rear wall of frame 51, and having its lower end in the path of movement of abutment nut 46. Lever 47 is operated by a pressure cylinder 55, on the front wall of frame 41, and connected to lever 47 through a toggle mechanism. The latter comprises links 57 connecting the piston rod of cylinder 55 to an end of bell crank 58 swingably mounted on a bracket 59 in the upper forward corner of frame 41. The other end of bell crank 58 is connected to the upper end of lever 47 by links 61.

The force of main cylinder 42 is exerted in an equalized manner upon levers 50 to equalize the pressures of studs 20 and 20' against the work. For this purpose, rods 48 carry adjustable nuts 62 and coil springs 63 surround the rods and each engage a nut 62 at one end and cross bar 44 at the opposite end. When the stud welder is activated, cylinder 42 moves its piston rod 43 and cross bar 44 rearwardly. Springs 63 transmit the force to nuts 62 and thus to levers 50, the levers being rocked counterclockwise (Fig. 1).

Stop lever 47 occupies the position of Fig. 1, with the toggle elements aligned. When studs 20, 20' contact the work, abutment nut 46 engages stop 47 to arrest further movement. After a time interval, cylinder 55 is energized to rock bell crank lever 58 to swing stop 47 counterclockwise. The swinging of levers 50 under the force of cylinder 42 continues to press the studs under high pressure against the work.

The stud feeding and length adjusting mechanism

Referring to Figs. 1, 2, 4, 5 the stud feeding and length adjustment means 60, 60' includes a pair of guides, such as guide blocks 65, 65', which are mounted on slide 22 rearwardly of brackets 25, 25', and are locked against longitudinal movement relative to the slide by suitable keys or the like. As the two stud feeding means 60, 60' are mirror copies of each other, only means 60 will be described in detail.

Guide 65 is a tubular member of square cross section whose lateral walls 64 are reduced in thickness at their forward ends to form recesses receiving the rear ends of links 38 in laterally flush relation. Each link has a bearing 66 in its rear end engaged with a headed pin 67 secured to a wall 64. A square cross section bushing 68 is mounted in the forward end of guide 65 and acts as a bearing for a reciprocable sleeve 70 acting as a mounting for the reciprocable stud feeding and length setting elements.

Sleeve 70 has a bore 71 in its forward end slidably receiving an internally threaded sleeve member 72, a key (not shown) being provided to lock sleeve 70 and member 72 against relative rotation while permitting relative reciprocation. The forward end of member 72 has a cylindrical recess, receiving an insulating bushing 73, and a flange 74. Bushing 73 receives a cylindrical abutment 76 on the rear end of stud push up rod 75 having a flange 77 mating with flange 74. An insulating gasket 78 is disposed between the two flanges, which are united by studs 81 extending through insulating bushings 82 in flange 77 and threaded into flange 74. At one zone, the outer surface of member 72 is flat-milled to receive a suitable stud length setting scale 80 (Fig. 5) cooperable with outer end of sleeve 70. The rear end of member 72 is internally threaded, as at 83, to cooperate with threads 84 on the forward end of a stud length adjusting rod 85.

Rearwardly of bore 71, sleeve 70 has an internally threaded section 86 cooperable with threads 87 on rod 85. The threads 84 and 87, and their cooperating threads in member 72 and sleeve 70, are oppositely directed. Thus, threads 83, 84 may be right handed and threads 86, 87 left handed, or vice versa. When rod 85 is rotated, member 72 will be moved outwardly or inwardly in sleeve 70, adjusting the distance between the forward end of rod 75 and sleeve 70. The rear end of sleeve 70 is threaded to receive the threaded forward end 88 of a bushing 90 slidably and rotatably receiving the reduced rearward section 89 of rod 85, a lock nut 91 being threaded on end 88.

Bushing 90 has, near its rear end, an integral circular collar 92 seatable in a corresponding recess 93 in the rear end of guide 65, and a second, somewhat smaller circular collar 94 integral with its rear end and longitudinally spaced from collar 92. The rear end of rod 85 is threaded to receive a lock nut 96 engageable with collar 94 to lock rod 85 after the stud length has been set, and has a knurled operating knob 97.

The operating mechanism for the stud feeding means comprises a pressure cylinder 95, mounted on the rear wall 103 of an upright angle bracket 98 secured to slide 22, and having its piston rod 99 secured to an intermediate portion of a generally T-shape crosshead 100. The inner end of crosshead 100 has a fork 101 engaged over bushing 90 between collars 92 and 94, and its outer end is secured to the outer end of a tubular guide 102 telescopically mounted in a guide block 105 mounted on the side wall 104 of bracket 98.

When cylinder 95 is activated, it moves crosshead 100 forwardly or rearwardly to reciprocate sleeve 70 and push up rod 75. The guide 102 sliding in guide block 105 prevents any binding of parts due to the lateral offset between piston rod 99 and sleeve 70.

Stud locking mechanism

Before the studs 20, 20' are forced under pressure against the work, it is necessary to lock the studs in collet chucks 45 and to lock sleeves 70, 70' to guides 65, 65', respectively. The collet chucks are of a well known construction involving telescoping chuck members operable to grip the studs when one member is moved relative to the other. A typical example of such a collet chuck is shown in the copending application of O. A. Neale, S. N. 78,484, filed February 26, 1949.

Chucks 45 have collars 106, 106' connected to one of the chuck members, and are power operated by pressure cylinders 110, 110' mounted on brackets 25, 25' respectively. Cylinders 110, 110' and their connected chuck operating parts are of the same construction, so only one chuck operating mechanism will be described. Piston rod 107 of cylinder 110 is connected to the outer end of a dual lever 108 which straddles a trunnion on bracket 25 and has its vertically spaced arms extending through openings in a wall of the bracket, lever 108 being pivoted intermediate its ends on the trunnion. The inner ends of the two arms of lever 108 are connected to a pair of rods 109, 109 extending forwardly through longitudinal passages in one bar 35 and die 40 above and below push up rod 75, and in the same vertical plane therewith (Fig. 8). The forward ends of the two rods 109 are connected to one of the collars 106. Consequently, when cylinder 110 is energized, lever 108 is rocked to reciprocate rods 109 and collar 106 to engage or release a chuck 45.

In order to assure positive application of pressure to the studs during welding, means are provided to lock rods 75, 75' to guides 65, 65' and slide 22. Referring to Figs. 4 and 6, guide 65, inwardly from its rear end and just rearwardly of the position of nut 91 in Fig. 4, is formed with a rectangular, vertical slot 111 slidably receiving a slide lock plate 112. The lower edge of plate 112 has a notch or groove 113 shaped to straddle bushing 90 behind lock nut 91. Plate 112 is secured to the piston rod 114 of a pressure cylinder 115 mounted on a bracket 116 supported on the upper surface of guide 65. When lock plate 112 has been moved to the position of Figs. 4 and 6, forward movement of guide 65 by levers 50 exerts a positive forward force on sleeve 70 through the lock plate 112 and nut 91.

Stud magazines and welding dies

The welding dies 40, 40', shown in greater detail in Figs. 7 and 8, also serve as stud magazines for the cyclical feeding of successive studs to chucks 45. Except for minor variations, both dies are mirror copies of each other and the same reference characters, primed in one case, are used to designate like or identical features.

The dies are cast blocks of copper or a copper alloy, each formed with a relatively large central bore or passage 121, 121', extending forwardly from its rear surface intermediate its upper and lower surfaces, and aligned with corresponding passages extending longitudinally and substantially centrally of secondary conductor bars 35, 35 and receiving stud push up rods 75, 75'. Smaller diameter intermediate passage 122, 122' connect bores 121, 121' to frusto-conical sockets or recesses 123, 123' in the forward faces of the dies, the sockets acting as mountings for the collet chucks 45. Rods 75, 75' have reduced extensions 124, 124' lying in passages 122, 122' substantially equal in length thereto. Above and below, and in vertical alignment with each passage 124, 124' are passages 126, 126' extending completely through each die and aligned with corresponding substantially central longitudinal passages in the secondary conductor bars to receive the chuck operating rods 109, 109' connected to chuck collars 106, 106'.

A stud feed slot 127 extends laterally outwardly at about 45° to the vertical from passage 122, terminating at its outer end in a socket seat 128 which may receive an insulated feed chute for studs 20. A corresponding slot 127' extends laterally inwardly from passage 122', terminating in a flat seat 128' formed by bevelling a part of the inside upper edge of die 40'. The inside upper edge of die 40 is correspondingly bevelled, as at 129, to form part of the chute seat. It will be noted that both stud feed slots extend toward the same side of the welder, facilitating feeding of studs to the die magazines.

Each time rod 75 is retracted, a fresh stud passes from slot 127 into passage 122 in front of extension 124. When rod 75 is advanced, the stud is advanced from passage 122 into collet chuck 45.

Operation of the welder

Figure 9:
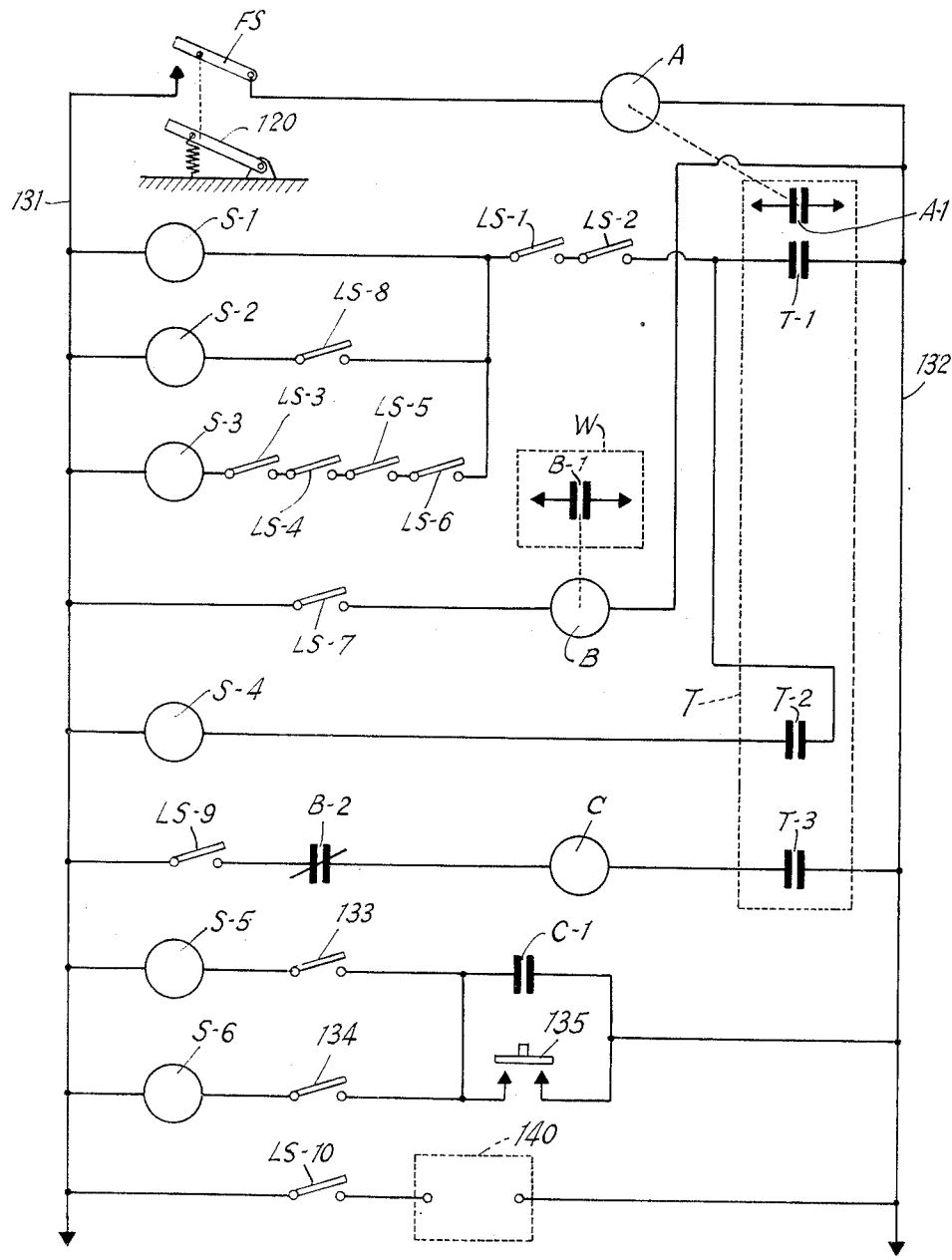
Fig. 9 is a schematic wiring diagram of the control circuit for the stud welder.

The operation of the welder control will be understood best by reference to Fig. 9. The automatic sequence of operations is effected through actuation of limit switches by movement of elements to and from predetermined positions, and by a weld timer and a welding control.

Referring to Fig. 9, limit switches LS—1 and LS—2 are arranged to be opened by suitable means, such as crossheads 100, 100' when the stud feeding means have projected fresh studs into the collet chucks. Limit switch LS—8 is closed, as by piston rod 43, when abutment nut 46 engages stop lever 47. Limit switches LS—3 and LS—4 are closed by lock plate 112 when the latter is in the position of Fig. 6. Limit switch LS—7 is closed by bell crank 58 in the fully released position of stop lever 47. Limit switches LS—9 and LS—10 are closed by piston rod 43, or elements connected thereto, in the fully retracted position of rod 43. To simplify and clarify the drawing illustrations, the several limit switches and the foot operated control switch FS have not been shown in Figs. 1 through 8.

In the normal position of the welder, studs 20, 20' are in chucks 45 and feed rods 75, 75' are forward so that limit switches LS—1 and LS—2 are closed. Piston rod 43 is fully retracted. The operator steps on foot treadle 120, closing switch FS and energizing control relay A from conductors 131, 132 connected to a suitable source of operating potential as indicated by the arrows. Relay A closes its contacts A—1 to start timer T, which latter closes its contacts T—1 energizing low pressure solenoid valve S—1 through closed switches LS—1 and LS—2.

Valve S—1 energizes cylinder 42 to move piston rod 43 rearwardly, swinging levers 50 counter-clockwise to move the slide and the bars 35, stud feeding means, and other elements mounted thereon, forwardly. This movement continues until the studs touch tube 15, at which time nut 46 engages stop lever 47 arresting further movement of the slide, and limit switch LS—8 is, at the same time, closed. It should be noted that the studs are initially positioned to extend ⅛" beyond chucks 45. The amount of such projection, particularly with respect to studs of different lengths, is set by adjustment of rods 85 to properly position member 72 relative to sleeve 70. This adjustment determines the limit of projection of rods 75, 75' through the dies 40, 40', and thus the amount of "push-up" of studs 20, 20'.

Closure of limit switch LS—8 operates solenoid valve S—2 to energize lock cylinders 115, 115' and chuck cylinders 110, 110'. The lock cylinders extend lock plates 112, 112' into the locking position of Figs. 4 and 6, so that the stud push up rods 75, 75' are effectively locked to slide 22. The chuck cylinders swing levers 108, 108' to draw rods 109, 109' rearwardly pulling collars 105, 106' to lock the studs in chucks 45. Completion of these locking operations closes limit switches LS—3, LS—4, LS—5, and LS—6 to energize solenoid valve S—3.

Valve S—3 activates cylinder 55 to operate the toggle linkage and swing stop lever 47 counter-clockwise so that further low pressure movement of piston rod 43 is permitted to swing levers 50 and effect low pressure push up of the studs against tube 15. At the same time, crank 58 closes limit switch LS—7 to pick up relay B, which closes its contacts B—1 in weld control W to initiate the welding current flow under control of timer T.

The duration of the initial welding pulse may be pre-set by timer T, which determines the number of cycles of the welding pulse. The initial welding pulse is followed by a cool period of, for example, one cycle. At the end of the cool period, timer T closes its contacts T—2 to activate high pressure solenoid valve S—4, which applies high pressure to cylinder 42 resulting in a high pressure push up of the studs against the tube 15 during the succeeding welding pulse. The duration of this pulse is likewise set by timer T. Following this second welding pulse, timer T initiates a hold time, of a presettable duration, during which the high pressure push up of the studs against the work is continued without the flow of welding current.

At the end of the hold time, contacts T—1 open, which deactivates solenoid valves S—1 through S—4. Valve S—1 reverses the action of cylinder 42 to retract the slide means and its supported elements, valve S—2 operates the lock and chuck cylinders to withdraw lock plates 112, 112' and release chucks 45, and valve S—3 reverses cylinder 55 to re-position stop lever 47 in the path of abutment nut 46. This opens switch LS—7 to deactivate the welder control W by dropping relay B to open its contacts B—1. The normally closed contacts B—2 are simultaneously returned to their closed position.

Meanwhile, timer contacts T—3 have previously been closed during the hold time. As piston rod 42 reaches the fully retracted position, it closes limit switches LS—9 and LS—10. Switch LS—9 picks up relay C through closed contacts B—2 and T—3. Provided the operators feed selector hand switches 133 and 134 are closed, closing of contacts C—1 activates valves S—5 and S—6 to energize feed cylinders 95, 95' to draw rods 75, 75' rearwardly. This allows fresh studs to fall into passages 122, 122' of the die blocks. The hold time contacts T—3 then open, dropping relay C to open contacts C—1 and deactivate valves S—5 and S—6. This reverses cylinders 95, 95' to move the feed rods forwardly, pushing the studs 20, 20' through chucks 45 to project the pre-set distance, such as ⅛". Limit switch LS—10 energizes suitable indexing mechanism 140 to position tube 15 for application of another pair of studs. The welder is now fully returned to its normal position for another welding cycle.

It should be noted that the stud feeds may be operated either individually or together, through use of the hand switches 133, 134, and that the feed operation may be automatic, as described, or manual through use of push button 135 in shunt with contacts C—1.

While a specific embodiment of the invention has been shown and described in detail to illustrate the application of the invention principles, it should be understood that the invention may be embodied otherwise without departing from such principles.

What is claimed is:

1. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and including a single open turn secondary winding mounted on said slide means and having its spaced open ends substantially at the forward end thereof; means for mounting a pair of studs in forwardly projecting, electrically conductive relation on the open ends of said winding; and mechanism operable to move said slide means relative to said supporting means to engage a so-mounted pair of studs with the metallic member.

2. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being substantially at the forward end of said slide means; means for mounting a pair of studs in forwardly projecting, electrically conductive relation on the forward ends of said bars; and mechanism operable to move said slide means relative to said supporting means to engage a so-mounted pair of studs with the metallic member to complete a low loss resistance welding circuit including said winding, the studs, and the metallic member.

3. Apparatus for resistance welding metallic studs to a metallic member comprising, in combination, a base; means for supporting the metallic member on said base; a resistance welding transformer mounted adjacent the metallic member supporting means and having a secondary winding including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending through a bar in alignment with a die passage; a pair of stud feeding means mounted rearwardly of said transformer and each operable to reciprocate a rod through a passage to feed studs from the magazines into the chucks; means selectively operable to lock said rods against movement relative to said feeding means; slide means mounted on said base for movement toward and away from said supporting means; said slide means mounting said winding and said stud feeding means for movement as a unit toward and away from said supporting means; and mechanism operable to move said slide means relative to said supporting means to engage a pair of studs, held in said chucks, with the metallic member to complete a low loss resistance welding circuit including said winding, the studs, and the metallic member.

4. Stud welding apparatus as claimed in claim 3 in which each of said stud feeding means comprises a cylinder mounted on said slide means and having a rearwardly extendable piston rod, a transversely extending cross head secured intermediate its ends to said piston rod, means securing a push up rod to one end of said cross head, and a pair of telescoped guide members parallel with said piston rod, one secured to said slide means and the other secured to the other end of said cross head.

5. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending longitudinally through a bar in alignment with a die passage; a pair of stud feeding means mounted on said slide means rearwardly of said transformer and each operable to reciprocate a rod through a passage to feed studs from the magazines into the chucks; means operable to lock said slide means against movement during operation of said stud feeding means; mechanism operable to move said slide means relative to said supporting means to engage a pair of studs, held in said chucks, with the metallic member to complete a low loss resistance welding circuit including said winding, the studs, and the metallic member; and means selectively operable to lock said rods against movement relative to said slide means during such movement of the latter.

6. Stud welding apparatus as claimed in claim 5 in which each stud feeding means includes a pair of telescoped members, one secured to the rear end of a push up rod and the other secured to said slide means, and mechanism for effecting relative reciprocation of said members, said one member having a transversely arranged abutment; and said locking means includes a slide reciprocable transversely of said other member into and out of locking relation with said abutment and fixed longitudinally relative to said other member, and means operable to position said slide selectively in the push up rod locking and unlocking positions.

7. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending longitudinally through a bar in alignment with a die passage; a pair of stud feeding means mounted on said slide means rearwardly of said transformer and each operable to reciprocate a rod through a passage to feed studs from the magazines into the chucks; means selectively operable to lock said rods against movement relative to said stud feeding means; and mechanism connected to said stud feeding means and operable to move said feeding means and said slide means relative to said supporting means to engage a pair of studs, held in said chucks, with the metallic member to complete a low loss resistance welding circuit including said winding, the studs, and the metallic member.

8. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending longitudinally through a bar in alignment with a die passage; a pair of stud feeding means mounted on said slide means rearwardly of said transformer and each operable to reciprocate a rod through a passage to feed studs from the magazines into the chucks; means adjustably interrelating said rods and said stud feeding means to adjust the position of said rods in accordance with the stud lengths; means selectively operable to lock said rods against movement relative to said slide means; and mechanism operable to move said slide means relative to said supporting means to engage a pair of studs, held in said chucks, with the metallic member to complete a low loss resistance welding circuit including said winding, the studs, and the metallic member.

9. Stud welding apparatus as claimed in claim 8 in which each stud feeding and length adjusting means includes a first member secured to said slide means, a second member mounted for longitudinal reciprocation relative to said first member, said second member being secured to the rear end of a push up rod, a third member mounted for longitudinally aligned reciprocation relative to said first member, an element secured to the rear end of said third member and fixed against longitudinal movement relative thereto, mechanism operative to selectively effect longitudinal reciprocation of said element, and a longitudinally adjustable interconnection between the adjacent ends of said second and third members.

10. Stud welding apparatus as claimed in claim 8 in which each stud feeding and length adjusting means includes a first member secured to said slide means, a second member mounted for longitudinal reciprocation relative to said first member and fixed against rotation relative thereto, said second member being secured to the rear end of a push up rod, a third member mounted for longitudinally aligned reciprocation relative to said first member and for rotation relative to said second member, an element secured to the rear end of said third member and fixed against longitudinal movement relative thereto, mechanism operative to selectively effect longitudinal reciprocation of said element, the adjacent ends of said second and third members being threadedly interconnected whereby rotation of said third member will adjust the distance between said second member and said element.

11. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending longitudinally through a bar in alignment with a die passage; a pair of stud feeding means mounted on said slide means rearwardly of said transformer and each operable to reciprocate a rod through a passage to feed studs from the magazines into the chucks; means operable to lock studs in said chucks and including operating means mounted on said slide means rearwardly of said transformer and elongated members each extending longitudinally through a bar and connecting a chuck to an operating means; means selectively operable to lock said rods against movement relative to said slide means; and mechanism operable to move said slide means relative to said supporting means to engage a pair of studs, held in said chucks, with the metallic member to complete a low loss resistance welding circuit including said winding, the studs, and the metallic member.

12. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending longitudinally through a bar in alignment with a die passage; a pair of stud feeding means mounted on said slide means rearwardly of said transformer and each operable to reciprocate a rod through a passage to feed studs from the magazines into the chucks and each including a first element secured to said slide means and a second element longitudinally reciprocable in said first element and secured to a push up rod; lock means selectively operable to lock said first and second elements against relative reciprocation; a pair of upwardly extending lever means pivotally mounted, intermediate their ends, on said base; links connecting the upper end of each lever means to one of said first elements; and power operated reciprocable means mounted on the underside of said base substantially beneath said transformer and connected to the lower ends of said lever means to rock the latter to move said slide means relative to said supporting means to engage a pair of studs, held in said chucks, with the metallic member to complete a low loss resistance welding circuit including said winding, the studs, and the metallic member.

13. Apparatus for resistance welding metallic studs to a metallic member comprising, in combination, a base; means for supporting the metallic member on said base; slide means mounted on said base for movement toward and away from said supporting means; a resistance welding transformer mounted on said base adjacent the forward end thereof and having a secondary winding mounted on said slide means and including a pair of laterally spaced, longitudinal bars and electrically conductive means interconnecting the rear ends of said bars, the forward ends thereof being electrically disconnected from each other; a pair of welding dies each conductively mounted on the forward end of a bar; a pair of collet chucks each mounted on the forward end of a die; each die having a stud magazine and a longitudinal passage connecting the magazine to the associated chuck; a pair of stud push up rods each extending longitudinally through a bar in alignment with a die passage; a pair of stud feeding means mounted on said slide means rearwardly of said transformer and each operable to reciprocate a rod through a passage to feed studs from the magazines into the chucks and each including a first element secured to said slide means and a second element longitudinally reciprocable in said first element and secured to a push up rod; lock means selectively operable to lock said first and second elements against relative reciprocation; a pair of upwardly extending lever means pivotally mounted, intermediate their ends, on said base; links connecting the upper end of each lever means to one of said first elements; power operated reciprocable means mounted on the underside of said base substantially beneath said transformer and connected to the lower ends of said lever means to rock the latter to move said slide means relative to said supporting means to engage a pair of studs, held in said chucks, with the metallic member to complete a low loss resistance welding circuit including said winding, the studs, and the metallic member; releasable stop means operatively associated with said power means and operable to limit operation thereof; mechanism operable to release said stop means; weld initiating means; control mechanism operable, responsive to operation of said weld initiating means, to energize said power means to move said slide forwardly to contact a pair of studs in said chucks with the metallic member, said stop means thereupon interrupting operation of said power means; control means operable by such advance of said slide means to activate said stud locking means to lock the studs in said chucks and to activate said lock means to interlock said first and second elements; automatic means operable, responsive to completion of such stud locking and operation of said lock means, to activate said stop releasing mechanism to release said power means to force said studs against the metallic member under pressure, and to energize said transformer; timer means operable to deenergize said transformer after a predetermined interval and, after a further predetermined interval, to reenergize said transformer and activate said power means to increase the pressure of the studs against the metallic member; said timer means, after a further predetermined interval, deenergizing said transformer during a "hold time," and, upon completion of such "hold time," operating said control mechanism, control means, and automatic means to effect release of said locks and retraction of said slide means; means operable by said timer means, during such "hold time," to energize said stud feeding means to retract the push up rods to provide for movement of fresh studs from the magazine into such passages; and means operable by said timer, upon completion of such "hold time," to energize said stud feeding means to advance the push up rods to feed the fresh studs into the chucks.

REIDAR P. C. RASMUSEN.

REFERENCES CITED

The following references are of record in the file of this patent:

UNITED STATES PATENTS

| Number | Name | Date |
|---|---|---|
| Re. 20,348 | Hoffer | May 4, 1937 |
| 2,003,320 | Trainer et al. | June 4, 1935 |
| 2,148,502 | Reyburn | Feb. 28, 1939 |
| 2,159,059 | Trainer et al. | May 23, 1939 |
| 2,254,494 | Rabezzana | Sept. 2, 1941 |